United States Patent
Hwang et al.

(10) Patent No.: US 7,894,197 B2
(45) Date of Patent: Feb. 22, 2011

(54) OPTICAL SENSING MODULE AND DISPLAY DEVICE USING THE SAME

(75) Inventors: Wei-Cheng Hwang, Hsinchu (TW); Chao-Wen Liu, Hsinchu (TW); Yung-Lung Liu, Hsinchu (TW); Chwen-Tay Hwang, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 627 days.

(21) Appl. No.: 11/949,780

(22) Filed: Dec. 4, 2007

(65) Prior Publication Data

US 2008/0316472 A1 Dec. 25, 2008

(30) Foreign Application Priority Data

Jun. 21, 2007 (TW) .............................. 96122295 A

(51) Int. Cl.
*H05K 5/00* (2006.01)
(52) U.S. Cl. ................... 361/752; 361/810; 361/807
(58) Field of Classification Search ............... 361/752, 361/797, 790, 800, 807, 810; 252/299.66, 252/299.01, 299.6, 299.63, 299.67; 349/113, 349/84, 86, 56, 19, 33, 182, 184
See application file for complete search history.

(56) References Cited

U.S. PATENT DOCUMENTS

| | | | |
|---|---|---|---|
| 6,614,422 B1 * | 9/2003 | Rafii et al. ................... 345/168 |
| 6,765,648 B2 * | 7/2004 | Takahara ..................... 355/67 |
| 7,016,711 B2 * | 3/2006 | Kurakane ................. 455/575.1 |
| 7,031,670 B2 * | 4/2006 | May .......................... 455/90.3 |
| 7,126,816 B2 * | 10/2006 | Krah ..................... 361/679.55 |
| 7,256,987 B2 * | 8/2007 | Weng ..................... 361/679.55 |
| 7,554,523 B2 * | 6/2009 | Chang et al. ................. 345/156 |
| 7,596,832 B2 * | 10/2009 | Hsieh et al. ................... 16/342 |
| 2007/0165372 A1 * | 7/2007 | Ye .............................. 361/683 |
| 2010/0020182 A1 * | 1/2010 | Wang et al. .............. 348/207.1 |

FOREIGN PATENT DOCUMENTS

| | | |
|---|---|---|
| JP | 2007-41455 | 2/2007 |
| TW | 200612364 | 4/2006 |
| TW | 200630927 | 9/2006 |
| TW | 200721063 | 6/2007 |
| WO | 2004049293 | 6/2004 |

OTHER PUBLICATIONS

"1st Office Action of China counterpart application", issued on Jul. 24, 2009, p. 1-p. 4.
"Office Action of Taiwan Counterpart Application", issued on Jul. 8, 2010, p. 1-p. 3.

* cited by examiner

*Primary Examiner*—Hung S Bui
(74) *Attorney, Agent, or Firm*—Jianq Chyun IP Office

(57) ABSTRACT

An optical sensing module is adapted to be assembled to a frame of a display device. The display device comprises a display module and the frame, and the display module has a display area and the frame surrounds the display area. The optical sensing module comprises a casing and an optical sensor. The casing is pivoted to the frame and the optical sensor is configured in the casing for sensing external light projecting on a side of the casing. The optical sensor is capable of sensing a brightness of the display area when the side of the casing faces the display area and sensing a brightness of an ambient light when the side of the casing doesn't face the display area.

8 Claims, 4 Drawing Sheets

OPTICAL SENSING MODULE AND DISPLAY DEVICE USING THE SAME

CROSS-REFERENCE TO RELATED APPLICATION

This application claims the priority benefit of Taiwan application serial no. 96122295, filed on Jun. 21, 2007. The entirety of the above-mentioned patent application is hereby incorporated by reference herein and made a part of this specification.

BACKGROUND OF THE INVENTION

1. Field of the Invention

The present invention generally relates to a display device, and more particularly, to a display device having an optical sensing module.

2. Description of Related Art

The brightness of image shown on an existing liquid crystal display (LCD) is usually set to be a fixed value, and thus, a user can not clearly see the image because of the dark image shown on the existing LCD in the daytime, and the eyes of a user may feel fatigued because of a too bright image shown on the existing LCD at night. In addition, the brightness and color of the image shown on the existing LCD may also vary with time. In order to detect the brightness of an ambient light and the brightness and color of the image shown on the existing LCD, the conventional technology provides a LCD with two optical sensors. Thus, the brightness and color of the image shown on the LCD may be maintained by the values sensed by the optical sensors.

Referring to FIG. 1, a conventional LCD 100 comprises a display module 110, a frame 120, a first optical sensor 130 and a second optical sensor 140. The display module 110 comprises a display area, and the frame 120 surrounds the display area. The first optical sensor 130 and the second optical sensor 140 are inlayed on the frame 120. The first optical sensor 130 is disposed on a surface of the frame 120 to sense the brightness of an ambient light, and the second optical sensor 140 is disposed on the frame 120 to cover a part of the display area and sense the brightness of the display area.

It should be noted that the cost of materials of the conventional LCD 100 is comparatively higher because of the two optical sensors 130 and 140 used in the conventional LCD 100. In addition, the second optical sensor 140 of the conventional LCD 100 is fixed on the frame 120 to cover a part of the display area, thus the second optical sensor 140 may shield a portion of the display area when the second optical sensor 140 is not used.

SUMMARY OF THE INVENTION

Accordingly, the present invention is directed to an optical sensing module, and an optical sensor of the optical sensing module may sense a brightness of a display area or a brightness of an ambient light.

The present invention is also directed to a display device, and an optical sensor of the optical sensing module of the display device may sense a brightness of a display area or a brightness of an ambient light.

Hereinafter, the present invention will be described in detail using the following embodiments.

The present invention is directed to an optical sensing module, which is adapted to be assembled to a frame of a display device. A display module of the display device comprises a display area, and the frame surrounds the display area. The optical sensing module comprises a casing and an optical sensor. The casing is pivoted to the frame, and the optical sensor is configured in the casing for sensing external light projecting on a side of the casing. The optical sensor is capable of sensing a brightness of the display area when the side of the casing faces the display area and sensing a brightness of an ambient light when the side of the casing doesn't face the display area.

The present invention is also directed to a display device, and the display device comprises a display module, a frame and an optical sensing module. The display module comprises a display area, and the frame surrounds the display area. The optical sensing module is configured on the frame, and comprises a casing and an optical sensor. The casing is pivoted to the frame, and the optical sensor is configured in the casing for sensing external light projecting on a side of the casing. The optical sensor is capable of sensing a brightness of the display area when the side of the casing faces the display area and sensing a brightness of an ambient light when the side of the casing doesn't face the display area.

The optical sensing module is pivoted to the frame of the display device, thus the optical sensor may sense the brightness of the display area when the side of the casing faces the display area and may sense the brightness of an ambient light when the side of the casing doesn't face the display area.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
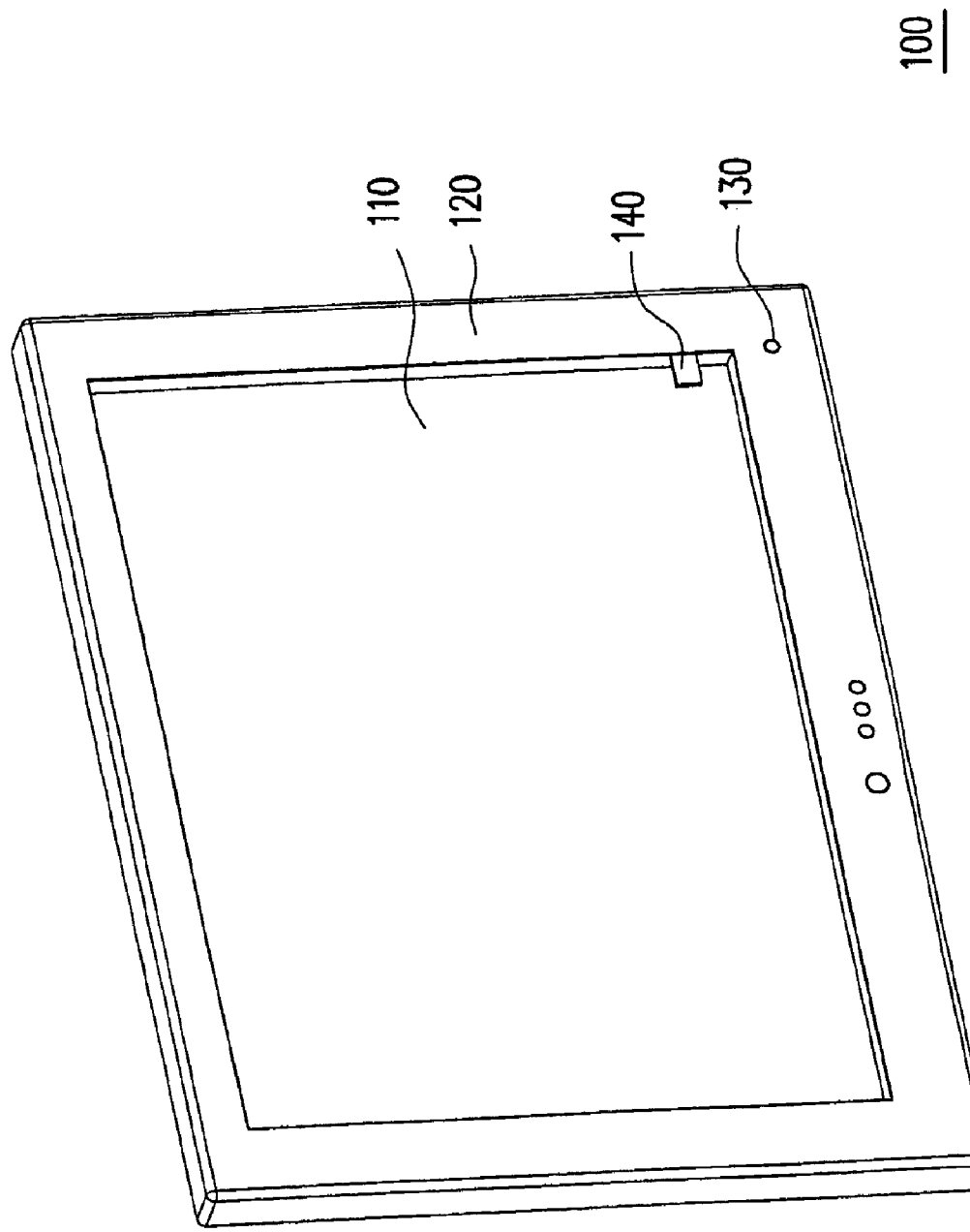
FIG. 1 is a perspective view of a conventional display device.
Figure 2:
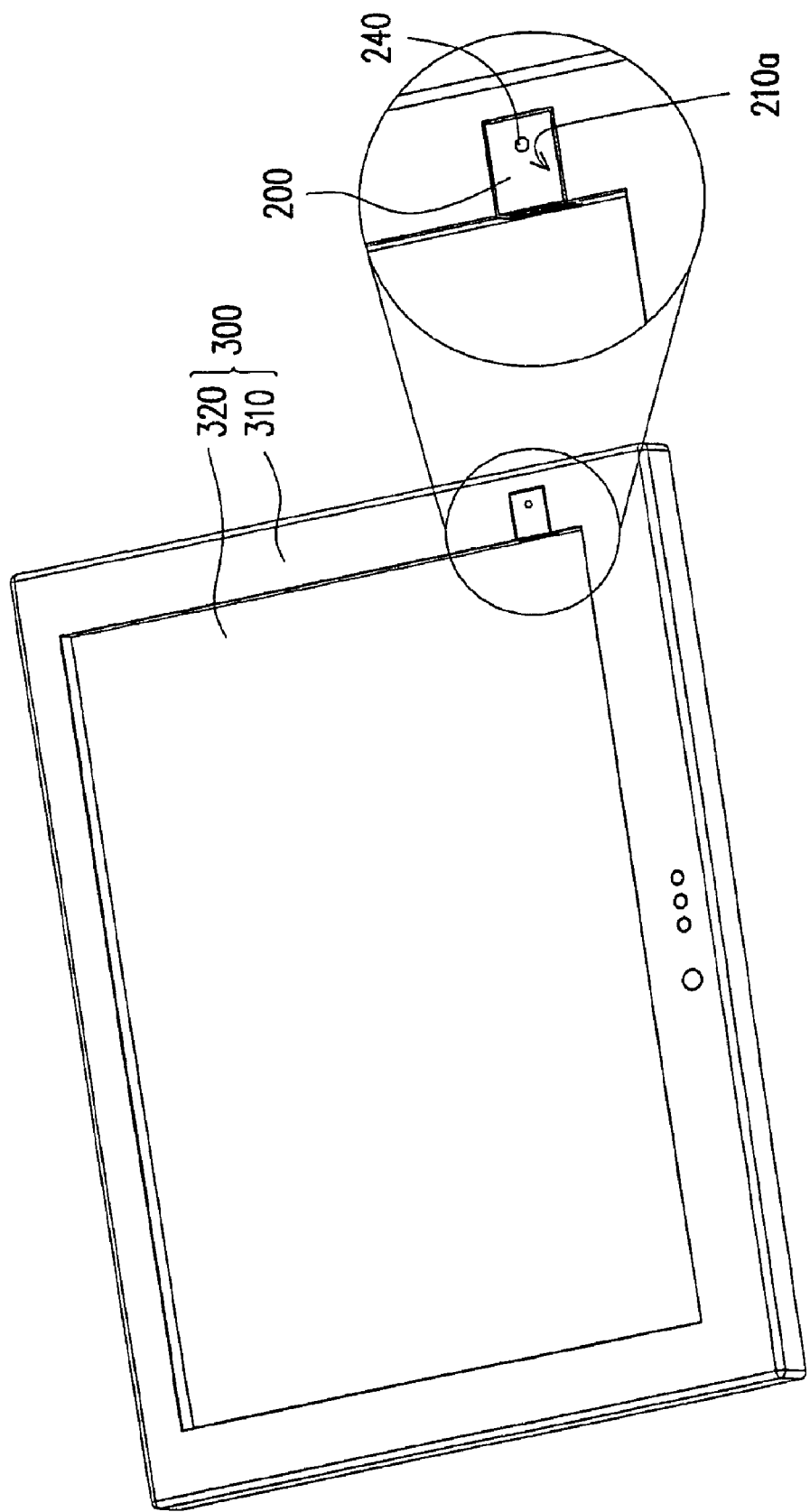
FIG. 2 is a perspective view of a display device according to an embodiment of the present invention.
Figure 3:
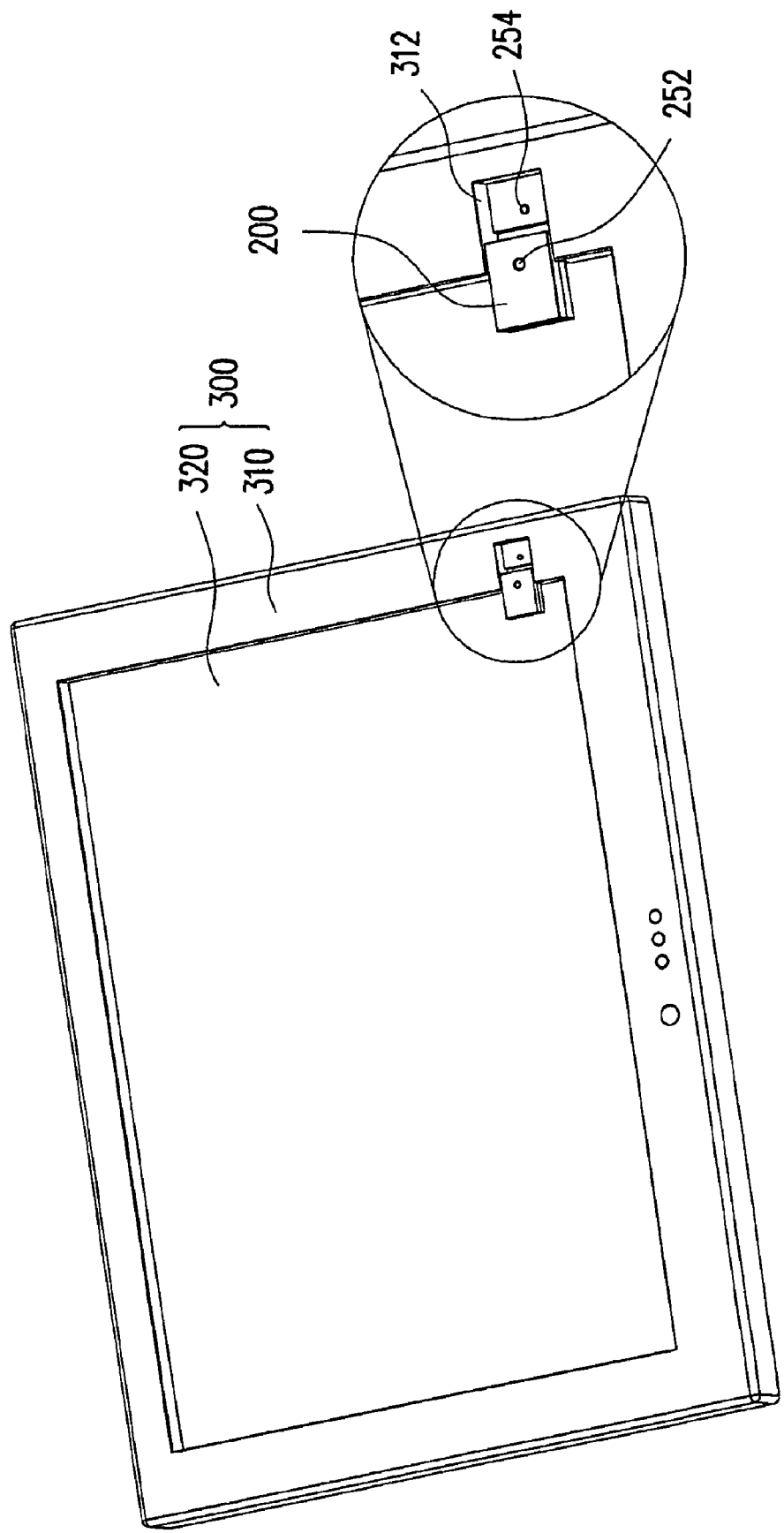
FIG. 3 is another perspective view of the display device shown in FIG. 2.
Figure 4:
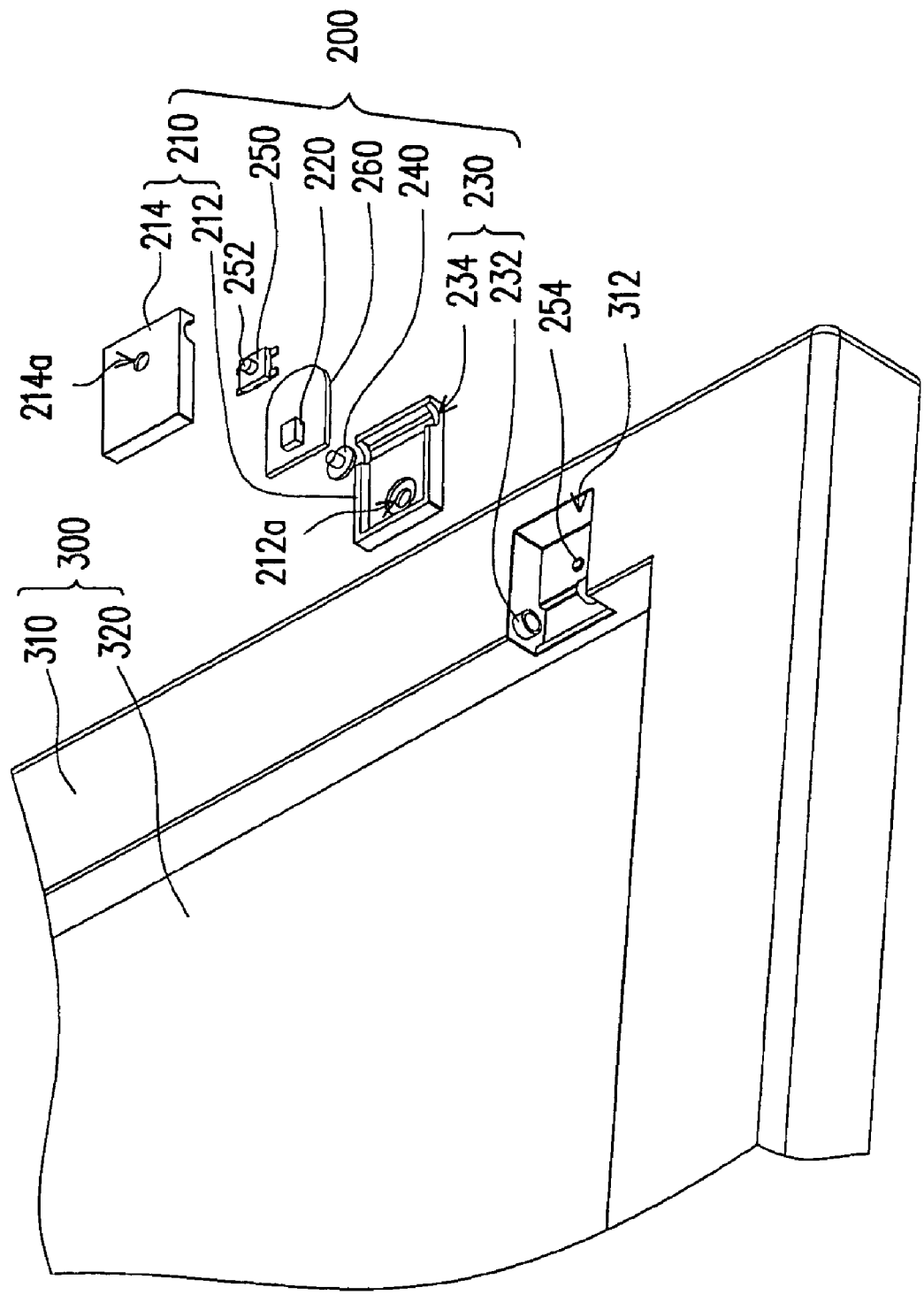
FIG. 4 is a partial enlarged explosion diagram illustrating the display device shown in FIG. 3.

Referring to FIG. 2 to FIG. 4, an optical sensing module 200 is configured on a frame 310 of a display device 300. The display device 300 further comprises a display module 320, and the display module 320 comprises a display area, and the frame 310 surrounds the display area. The optical sensing module 200 comprises a casing 210 (shown in FIG. 4) and an optical sensor 220 (shown in FIG. 4). The casing 210 is pivoted to the frame 310, and the optical sensor 220 is configured in the casing 210 to sense external light projecting on a side 210a (shown in FIG. 2) of the casing 210. In the embodiment, the optical sensor 220 is installed on a circuit board 260. The optical sensor 220 may sense a brightness of the display area when the side 210a of the casing 210 faces the display area (as shown in FIG. 3) and may sense a brightness of an ambient light when the side 210a of the casing 210 doesn't face the display area (as shown in FIG. 2).

In the embodiment, the optical sensing module 200 further comprise a pivoting mechanism 230 (shown in FIG. 4), and the casing 210 may be pivoted to the frame 310 by using the pivoting mechanism 230. The pivoting mechanism 230 comprises an axis 232 and a bearing 234, and the axis 232 is pierced into the bearing 234, and the axis 232 may be connected to the frame 310, and the bearing 234 may be disposed in the casing 210, such that the optical sensing module 200 may rotate along an axle center of the axis 232 by the coordination between the axis 232 and the bearing 234. According to another embodiment of the present invention (not shown), the axis 232 of the pivoting mechanism 230 may be connected to the casing 210, and the bearing 234 of the pivoting mechanism 230 may be connected to frame 310. Thus, when the optical sensing module 200 is used to sense the brightness of the ambient light, the casing 210 may be disposed out of the display area, such that the side 210a of the casing 210 doesn't face the display area. And when the optical sensing module 200 is used to sense the brightness of the display area, the casing 210 may be rotated by 180° along the axle center of the axis 232 to be disposed on the display area, such that the side 210a of the casing 210 faces the display area.

Next, referring to FIG. 4, in the embodiment, the casing 210 comprises an upper cover 212 and lower cover 214, wherein the upper cover 212 may comprise a first open pore 212a, and the lower cover 214 may comprise a second open pore 214a. In addition, the optical sensing module 200 further comprises a light pipe 240 and a switching device 250, wherein the light pipe 240 is disposed between the upper cover 212 and the optical sensor 220, and the switching device 250 is disposed between the lower cover 214 and the optical sensor 220. The light pipe 240 may correspond to the first open pore 212a, such that external light projecting on the side 210a of the casing 210 and getting through the first open pore 212a may be projected on the optical sensor 220 via the light pipe 240. In addition, the switching device 250 may correspond to the second open pore 214a, and a button 252 of the switching device 250 may be disposed in the second open pore 214a. In the embodiment, the switching device 250 may also be disposed on the circuit board 260.

Next, the frame 310 of the display device 300 further comprises an accommodating concave 312 for accommodating the casing 210, and the switching device 250 further comprises a pushing part 254, and the axis 232 of the pivoting mechanism 230 and the pushing part 254 of the switching device 250 may be disposed in the accommodating concave 312. In addition, a shape of the casing 210 may correspond to a shape of the accommodating concave 312, such that the casing 210 may be completely accommodated in the accommodating concave 312 when the optical sensing module 200 is configured on the frame 310. And the position of the pushing part 254 may correspond to the button 252 in the second open pore 214a, such that when the optical sensing module 200 is accommodated in the accommodating concave 312, the pushing part 254 may press the button 252, and according to the system, the optical sensor 220 may sense the brightness of the ambient light instead of sensing the brightness of the display area.

It should be noted that when the optical sensing module 200 is accommodated in the accommodating concave 312, the side 210a of the casing 210 may be flushed with a surface of the frame 310 (as shown in FIG. 2) to maintain the planeness of the surface of the frame 310.

In summary, one or more of the advantages of the optical sensing module of the present invention are described as follows:

1. The optical sensing module of the present invention only comprises one optical sensor, thus the cost of materials of the optical sensing module is comparatively lower.

2. The optical sensing module is pivoted to the frame of the display device, thus the optical sensor may sense the brightness of the display area when the side of the casing faces the display area and may sense the brightness of the ambient light when the side of the casing doesn't face the display area.

3. When the optical sensing module is accommodated in the accommodating concave, the side of the casing may be flushed with a surface of the frame to maintain the planeness of the surface of the frame.

4. When the optical sensing module is pivoted to be accommodated in the accommodating concave, the pushing part may press the button correspondingly, such that according to the system, the optical sensor may sense the brightness of the ambient light instead of sensing the brightness of the display area.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical sensing module assembled to a frame of a display device, wherein a display module of the display device comprises a display area, and the frame surrounds the display area, the optical sensing module comprising:
    a casing, pivoted to the frame;
    an optical sensor, configured in the casing for sensing external light projecting on a side of the casing, wherein the optical sensor is capable of sensing a brightness of the display area when the side of the casing faces the display area and sensing a brightness of an ambient light when the side of the casing doesn't face the display area;
    a switching device, configured in the casing, comprising a button; and
    a pushing part, configured on the frame, wherein a position of the pushing part corresponds to the button, when the button is pressed by the pushing part, the optical sensor senses the brightness of the ambient light, and when the button is not pressed by the pushing part, the optical sensor senses the brightness of the display area.

2. The optical sensing module according to claim 1, wherein the frame further comprises an accommodating concave capable of accommodating the casing, wherein a shape of the casing corresponds to a shape of the accommodating concave.

3. The optical sensing module according to claim 1, further comprising a pivoting mechanism, wherein the casing is pivoted to the frame by the pivoting mechanism, the pivoting mechanism comprises an axis and a bearing, the axis is pierced into the bearing, the axis is connected to one of the casing and the frame, and the bearing is connected to the other one of the casing and the frame.

4. The optical sensing module according to claim 1, further comprising a light pipe configured between the side of the casing and the optical sensor for guiding external light projecting on the side of the casing to the optical sensor.

5. A display device, comprising:
    a display module, comprising a display area;
    a frame, surrounding the display area,
    an optical sensing module, configured on the frame, comprising:
        a casing, pivoted to the frame;
            an optical sensor, configured in the casing for sensing external light projecting on a side of the casing, wherein the optical sensor is capable of sensing a brightness of the display area when the side of the casing faces the display area and sensing a brightness of an ambient light when the side of the casing doesn't face the display area;
    a switching device, configured in the casing, comprising a button; and
    a pushing part, configured on the frame, wherein a position of the pushing part corresponds to the button, when the button is pressed by the pushing part, the optical sensor senses the brightness of the ambient light, and when the button is not pressed by the pushing part, the optical sensor senses the brightness of the display area.

6. The display device according to claim 5, wherein the frame further comprises an accommodating concave capable of accommodating the casing, wherein a shape of the casing corresponds to a shape of the accommodating concave.

7. The display device according to claim 5, further comprising a pivoting mechanism, wherein the casing is pivoted to the frame by the pivoting mechanism, the pivoting mechanism comprises an axis and a bearing, the axis is pierced into the bearing, the axis is connected to one of the casing and the frame, and the bearing is connected to the other one of the casing and the frame.

8. The display device according to claim 5, further comprising a light pipe configured between the side of the casing and the optical sensor for guiding external light projecting on the side of the casing to the optical sensor.

* * * * *